United States Patent [19]
Johnston et al.

[11] Patent Number: 5,855,417
[45] Date of Patent: Jan. 5, 1999

[54] INTEGRAL CONTROL AND ISOLATION VALVE PROPORTIONAL BRAKE SYSTEM

[75] Inventors: Gary Lee Johnston, Pleasant Hill; James William Zehnder, II, Huber Heights; William Charles Kruckemeyer, Beaver Creek; Michael Leslie Oliver, Xenia, all of Ohio

[73] Assignee: General Motors Corporation, Detroit, Mich.

[21] Appl. No.: 304,333

[22] Filed: Sep. 12, 1994

[51] Int. Cl.$^6$ .................................................. B60T 13/74
[52] U.S. Cl. .......................... 303/3; 363/10; 363/116.2; 363/117.1
[58] Field of Search .................... 303/3, 10, 11, 303/115.1, 115.2, 116.1, 116.2, 119.1, 119.2, 113.4, 117.1

[56] References Cited

U.S. PATENT DOCUMENTS

| | | | |
|---|---|---|---|
| 4,812,777 | 3/1989 | Shirai | 303/10 |
| 5,141,296 | 8/1992 | Arikawa | 303/113.2 |
| 5,152,585 | 10/1992 | Patient et al. | 303/10 |
| 5,246,281 | 9/1993 | Leppek | 303/114.1 |
| 5,246,283 | 9/1993 | Shaw et al. | 303/115.2 |

FOREIGN PATENT DOCUMENTS

| | | | |
|---|---|---|---|
| 63-38070 | 2/1988 | Japan | 303/116.2 |
| 2252373 | 8/1992 | United Kingdom | 303/116.2 |
| 93/09012 | 5/1993 | WIPO | 303/116.2 |

OTHER PUBLICATIONS

Japan Autotech Report, vol. 151, Sep. 5, 1992, pp. 22–24.

*Primary Examiner*—Lee W. Young
*Attorney, Agent, or Firm*—Jeffrey A. Sedlar

[57] ABSTRACT

In a vehicle braking system, integral control and isolation valves are used to individually control the brake line pressure to each wheel brake and to provide pedal isolation for each brake channel. The system is operable on a single fluid or a separated fluid system with an integrated power source. Full proportional anti-lock braking and traction control is provided to each selected wheel independently. The system is applicable as a two, three or four channel base brake system.

9 Claims, 2 Drawing Sheets

INTEGRAL CONTROL AND ISOLATION VALVE PROPORTIONAL BRAKE SYSTEM

BACKGROUND OF THE INVENTION

This invention relates to fluid brake systems for vehicles.

A conventional vehicle fluid brake system includes a master cylinder which is connected by a piping system to brake calipers or wheel cylinders at each wheel. Movement of master cylinder pistons by a brake pedal actuator develops fluid pressure which is transmitted through the piping system to the wheel calipers or cylinders. Braking systems conventionally include a power source which utilizes either engine vacuum and atmospheric pressure or hydraulic pressure to provide power assist or "boost" to the master cylinder in applying fluid force to the braking system.

When a brake pedal is depressed, force is transferred by a push rod to the master cylinder primary piston which moves forward. Under normal conditions the combination of fluid pressure and the force of the primary piston's spring moves a secondary piston forward at the same time. When the pistons move forward, fluid is displaced until front and rear wheel brake linings contact the rotors or drums. Subsequently, hydraulic pressure is built up and transmitted to the front and rear wheels causing the brakes to be applied.

When the brake pedal actuator is released, fluid is forced back through the piping system to the master cylinder. Excess fluid returns to a reservoir which is generally mounted on top of the master cylinder.

Three typical types of general brake systems are two-channel, three-channel, and four-channel systems. Two-channel systems include diagonal split systems and front/rear split systems. In a diagonal split system the left front and right rear brakes are connected with one master cylinder piston forming a channel. The right front and left rear brakes are connected with the other master cylinder piston forming another channel. A typical front/rear split brake system includes one master cylinder piston that is connected with the front brakes and another that is connected with the rear brakes. In a three-channel arrangement the brake system is split into independent left/front and right/front channels and a combined rear channel. In a four-channel arrangement the brake system is divided into a separate channel for each of the four wheel brakes.

The art has adapted conventional vehicle fluid brake systems as thus far described to sophisticated control mechanisms which represent a combination of hydraulic and electrical control and provide advanced braking functions. One such mechanism, an anti-lock braking system (ABS), typically modulates the fluid pressure delivered to a vehicle wheel brake to prevent the vehicle wheel brake from locking up in certain braking conditions. Another such mechanism, traction control (TC), typically modulates the fluid pressure delivered to a vehicle wheel brake to prevent spinning of a powered vehicle wheel, thereby maximizing the traction that is exerted by the vehicle's drive wheels. When a vehicle is being braked or accelerated a typical ABS or TC system operates to individually maximize the force between each wheel and the road surface to maximize vehicle braking or acceleration.

The integration of ABS and TC into vehicle braking systems has presented the challenge to provide a competitive, integrated braking system that is adaptable to providing normal braking, anti-lock braking and traction control operation for the various types of braking systems.

SUMMARY OF THE INVENTION

The present invention concerns the hydraulic aspects of a brake system that provides proportional braking to each brake channel or wheel brake independently with the ability to provide anti-lock braking and traction control to each selected wheel independently. Therefore, the invention is applicable as a two, three or four channel fluid braking system and is adaptable to provide anti-lock braking and traction control when sensors and an appropriate algorithm as conventionally known in the art are added to the system.

The present invention operates according to the concept of using an integral control and isolation valve to control brake line pressure to each wheel and concurrently provide pedal isolation for each brake channel. This system is adapted to operate on a single fluid (brake fluid) or to provide fluid separation allowing for the use of integrated power sources. A competitive system is provided by using a single solenoid valve to provide proportional control of brake line pressure and to provide brake pedal channel isolation.

The system can be characterized as an integration of two parallel systems. The first system comprises a means of selectively applying pressurized fluid to the wheel brake by a brake pedal actuator and non-boosted master cylinder. The second system comprises a means of selectively applying pressurized fluid to the wheel brake by a hydraulic pump. This second system is responsive to both the vehicle's electronic control unit (ECU) and brake pedal actuated pressure input. The system that actually supplies the braking fluid pressure in a given situation is selected by automatic positioning of the integral control and isolation valve. Additionally, the integral control and isolation valve provides proportional control when the selected system is the second system which utilizes pressure supplied by the hydraulic pump.

The integral control and isolation valve is preferably a solenoid controlled, spring offset directional valve which is infinitely positionable to provide the additional feature of controlling the amount as well as the direction of fluid flow. The integral control and isolation valve operates in an automatic mode and a base brake mode, which is the off or default mode established by the spring offset whenever an overriding control signal is absent.

In the automatic mode, the integral control and isolation valve is positioned to provide an isolated brake pedal channel preferably incorporating artificial pedal feel devices. The artificial pedal feel devices provide a tunable means of emulating conventional braking response or "feel" at the pedal.

The integral control and isolation valve provides increased or decreased fluid pressure to the wheel brake in response to increased or decreased pressure in the isolated brake pedal channel. A pedal channel pressure signal is generated by a pressure transducer and is communicated to the brake ECU. In response, the ECU signals the actuator of the integral control and isolation valve or valves to proportionally provide an appropriate fluid pressure to actuate the wheel brake for normal braking.

The integral control and isolation valve is infinitely positioned, within a range, by the ECU controlled actuator to provide fluid pressure to the wheel brake in response to pressure in the isolated brake pedal channel. The system therefore, is readily adaptable to any sized vehicle since braking force is adjustable by varying the fluid supply pressure.

Also in the automatic mode, the ECU preferably effects the ABS and TC functions. In response to predetermined vehicle operating variables the ECU signals the actuator of the integral control and isolation valve or valves to selectively actuate the associated wheel brake with increased or decreased fluid pressure whenever a TC or an ABS situation is required for one or more of the vehicle's wheels.

In the base brake mode, the integral control and isolation valve is positioned to provide braking pressure directly from the brake pedal channel to the wheel brake and only provides braking pressure up to the limit that is created by pedal actuation and nonboosted master cylinder operation. In this mode, the artificial pedal feel devices are preferably eliminated from the brake pedal circuit. Isolating the pedal channel from the artificial pedal feel devices is desirable in the base brake mode to provide a solid pedal feel.

The base brake mode is automatically selected by the ECU whenever a selected preprogrammed event occurs with the integral control and isolation valve. The system provides managed failure modes to default one or all integral control and isolation valves to base brakes depending upon the situation and the preselected ECU programming. The normal power-off positions of the valves place the system in the base brake mode.

DETAILED DESCRIPTION OF THE PREFERRED EMBODIMENT

Figure 1:
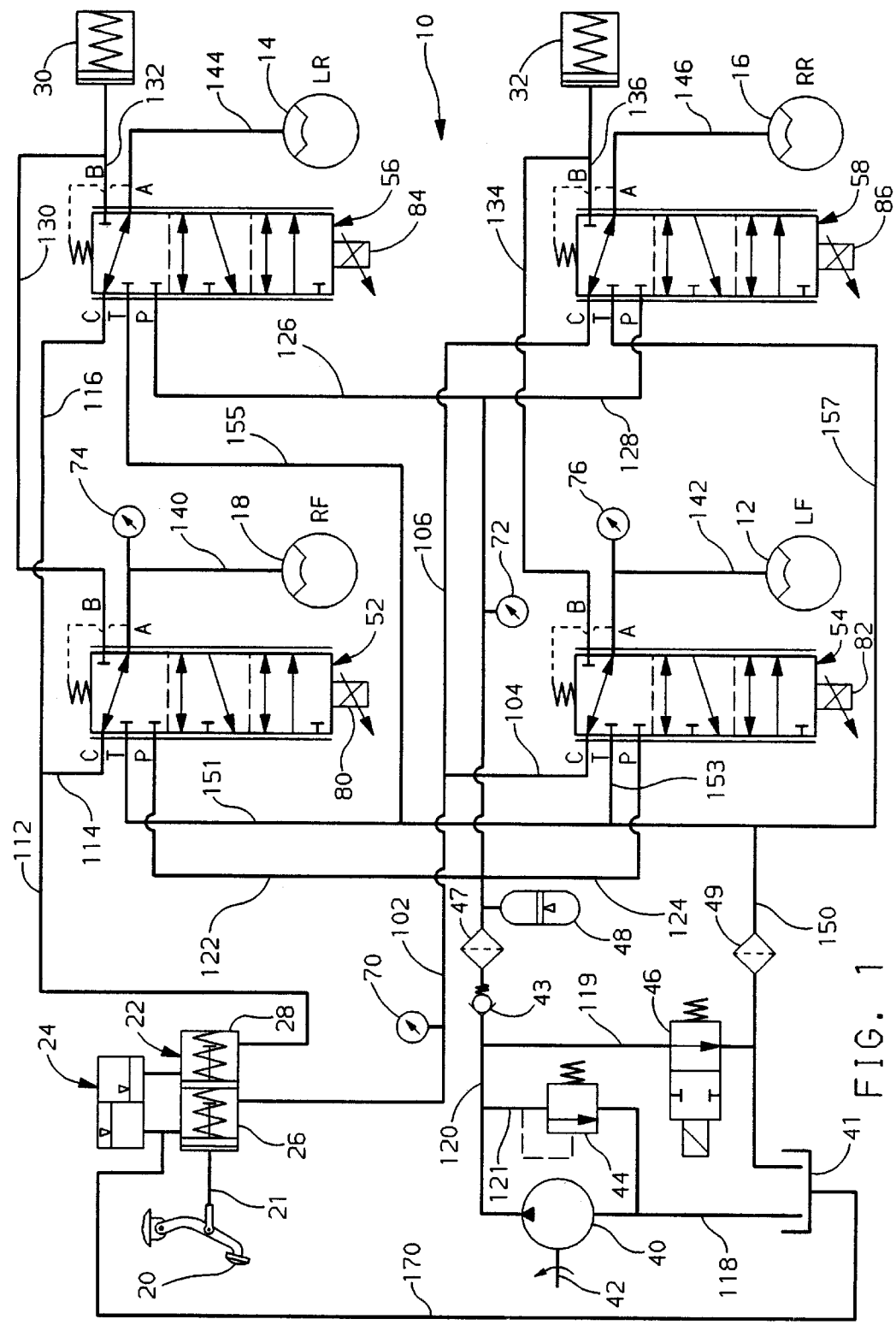
FIG. 1 is a schematic diagram of an integral control an isolation valve arrangement applied to a diagonal split brake system.

Referring to FIG. 1, a system schematic illustrates a brake system 10 using integral control and isolation valves 52, 54, 56 and 58 to control the brake line pressure independently, to each wheel brake 18, 12, 14 and 16 and to provide pedal isolation for each brake channel. This system is illustrated using brake fluid as the only working fluid and as applied to a two-channel, diagonal split base brake system.

As illustrated, one channel, through pressure chamber 28 of master cylinder 22, operates the right-front brake 18 and left-rear brake 14. The other channel, through pressure chamber 26 of master cylinder 22, operates the left-front brake 12 and right-rear brake 16. The system is flexible in that it is designed to operate on a single fluid (brake fluid), as illustrated, or to provide fluid separation allowing the use of integrated power sources. Additionally, the system is applicable to a brake system that incorporates two, three, or four channel base brake control.

System 10 includes conventional dual piston master cylinder 22 for separate pressurization of each braking channel through pressure chambers 26 and 28. Fluid reservoir 24 supplies fluid to master cylinder 22. Through the cooperation of master cylinder 22 with brake pedal actuator 20 by means of link 21, a selectively applied means of manual actuation is provided for the system 10. System 10 includes four integral control and isolation valves 52, 54, 56 and 58. The four valves are shown in the base brake mode, which is the default (normal) position for the system 10.

Leading from pressure chamber 26 of master cylinder 22 is pressure line 102. Pressure line 102 includes pressure transducer 70 which provides a means for sensing the fluid pressure magnitude within pressure line 102 and communicating the sensed pressure magnitude to an ECU (not illustrated). The ECU manages the operation of the system 10 when in the automatic mode. The pressure magnitude sensed by pressure transducer 70, is that applied to the system by means of brake pedal actuator 20.

Pressure line 102 communicates with branch line 104 and branch line 106. Branch line 104 is connected to port C of integral control and isolation valve 54. Branch line 106 is connected to port C of integral control and isolation valve 58.

Master cylinder 22 includes pressure chamber 28 which is in fluid communication with pressure line 112. Pressure line 112 communicates with branch line 114 and branch line 116. Branch line 114 is connected to port C of integral control and isolation valve 52. Branch line 116 is connected to port C of integral control and isolation valve 56.

System 10 includes pump 40 which has drive shaft 42 to provide motion from the vehicle's engine (not illustrated), to the rotating members of pump 40. Pump inlet line 118 is connected to pump 40 supplying fluid thereto from reservoir 41. Reservoir 41 is connected to reservoir 24 through line 170. Also connected to pump 40 is pressure line 120 which supplies pressure to the system 10.

Regulator line 121 branches from pressure line 120 and leads to pump inlet line 118. Positioned in regulator line 121 is pressure regulator 44. Pressure regulator 44 regulates the maximum pressure that is allowed to build up in the hydraulic system. When a pre-set pressure magnitude is surpassed, pressure regulator 44 opens, permitting the fluid supplied to pressure line 120 to return through regulator line 121 to inlet line 118.

Also branching from pressure line 120 is bypass line 119 which leads to return line 150. Positioned in bypass line 119 is pressure charging valve 46. The fluid pressure in system 10 is maintained by gas charged accumulator 48. In the present embodiment system pressure is preferably maintained between 2400 and 2600 psi. Pressure charging valve 46 comprises a solenoid actuated two-way valve that is spring biased to the normally open position. When the pressure in system 10, which is communicated to the ECU, drops below 2400 psi, pressure charging valve 46 closes to maintain system pressure within the preferred range. When the pressure in system 10 rises above 2600 psi, pressure charging valve 46 opens permitting a flow of fluid through pressure line 120 from pump 40 to bypass the system and return through return line 150 to reservoir 41.

Pressure charging valve 46 is included since pump 40 is driven by the vehicle's engine through drive shaft 42 at a variable rate. Alternatively, an electric motor drive is used with pump 40, wherein the motor is switched on and off by the ECU to maintain the pressure in system 10 within the desired range. Use of such an electric motor drive obviates the need for the pressure charging valve 46.

Pressure line 120 includes check 43 which prevents flow through pressure line 120 in the reverse direction. Filter 47 is included in pressure line 120 for removing contamination from the fluid travelling therethrough. Pressure line 120 also includes pressure transducer 72 for sensing and communicating the pressure magnitude in pressure line 120 to the ECU.

Pressure line 120 is in fluid communication with branch line 122, branch line 124, branch line 126 and branch line 128. Branch line 122 is connected to port P of integral control and isolation valve 52. Branch line 124 is connected to port P of integral control and isolation valve 54. Branch line 126 is connected to port P of integral control and isolation valve 56. Branch line 128 is connected to port P of integral control and isolation valve 58. Through this network, fluid is supplied for providing independent wheel brake control in the automatic mode.

Return line 150 is provided for the return of fluid from the system to reservoir 41. Return line 150 includes filter 49 for removing contaminants from the fluid returned to reservoir 41. Return line 150 is in fluid communication with branch return lines 151, 153, 155 and 157. Branch return line 151 is connected to port T of integral control and isolation valve 52. Branch return line 153 is connected to port T of integral control and isolation valve 54. Branch return line 155 is connected to port T of integral control and isolation valve 56. Branch return line 157 is connected to port T of integral control and isolation valve 58.

The system 10, in the normal automatic mode, includes artificial pedal feel devices 30 and 32 to provide an acceptable feel or resistance to brake pedal actuator 20 when manual pressure is applied thereto. Artificial pedal feel device 30 is in fluid communication with emulator line 132 and emulator line 130. Emulator line 132 is connected to port B of integral control and isolation valve 56. Emulator line 130 is connected to port B of integral control and isolation valve 52. Artificial pedal feel device 32 is in fluid communication with emulator lines 134 and 136. Emulator line 134 is connected to port B of integral control and isolation valve 54. Emulator line 136 is connected to port B of integral control and isolation valve 58.

Artificial pedal feel device 30 and 32 generally comprise a spring biased piston and a charging chamber which receives fluid from the emulator lines when the pressure is sufficient to displace the piston against the spring's bias. The artificial pedal feel devices 30 and 32 are tunable, in-that, the diameter of the piston or the spring rate is changeable to provide a selected resistance or pedal feel to the brake pedal actuator 20.

The system also includes right front brake 18, left front brake 12, left rear brake 14 and right rear brake 16. Right front brake 18 is in fluid communication with brake line 140 which in turn is connected to port A of integral control and isolation valve 52. Brake line 140 is also in fluid communication with pressure transducer 74 which senses and communicates the pressure magnitude in brake line 140 to the ECU. Left front brake 12 is in fluid communication with brake line 142 which in turn is connected to port A of integral control and isolation valve 54. Brake line 142 is also in fluid communication with pressure transducer 76 which senses and communicates the fluid pressure magnitude in brake line 142 to the ECU. Left rear brake 14 is in fluid communication with brake line 144 which in turn is connected to port A of integral control and isolation valve 56. Right rear brake 16 is in fluid communication with brake line 146 which in turn is connected to port A of integral control and isolation valve 58.

Integral control and isolation valve 52, 54, 56 and 58 are identical. Integral control and isolation valve 52 includes variable solenoid actuator 80 for selected valve positioning. Integral control and isolation valve 54 includes variable solenoid actuator 82 for selected valve positioning. Integral control and isolation valve 56 includes variable solenoid actuator 84 for selected valve positioning. Integral control and isolation valve 58 includes variable solenoid actuator 86 for selected valve positioning.

Figure 2:
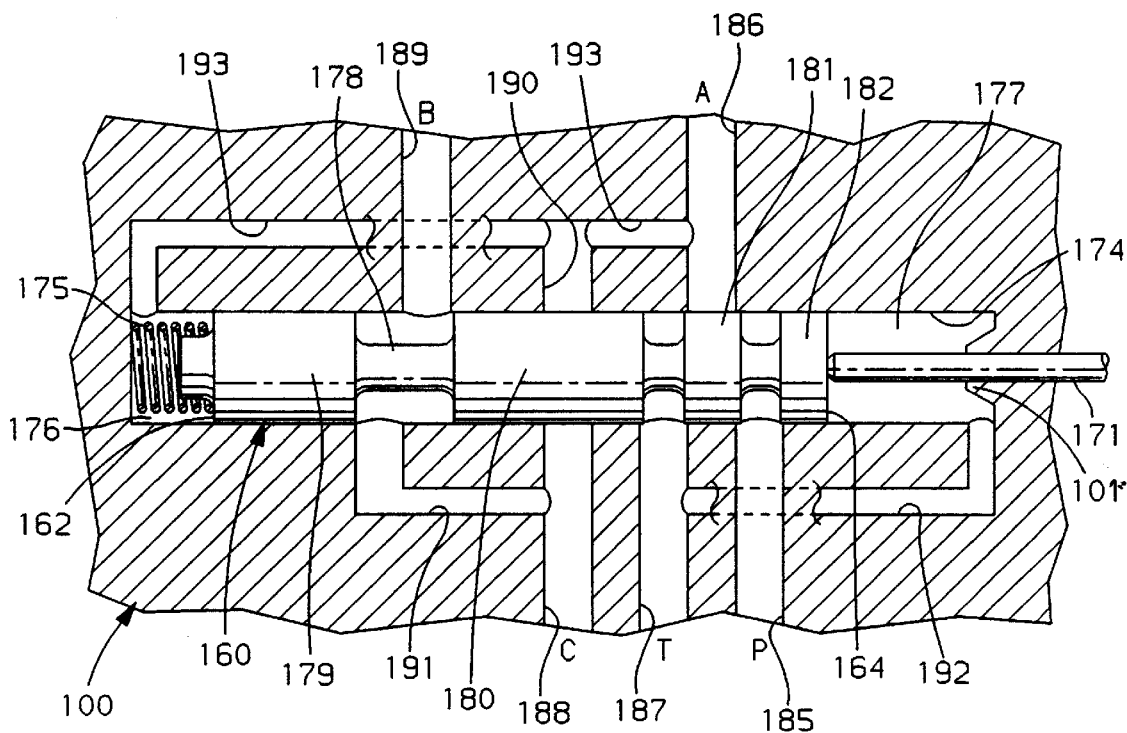
FIG. 2 is a schematic representation of an integral control and isolation valve in the automatic position.
Figure 3:
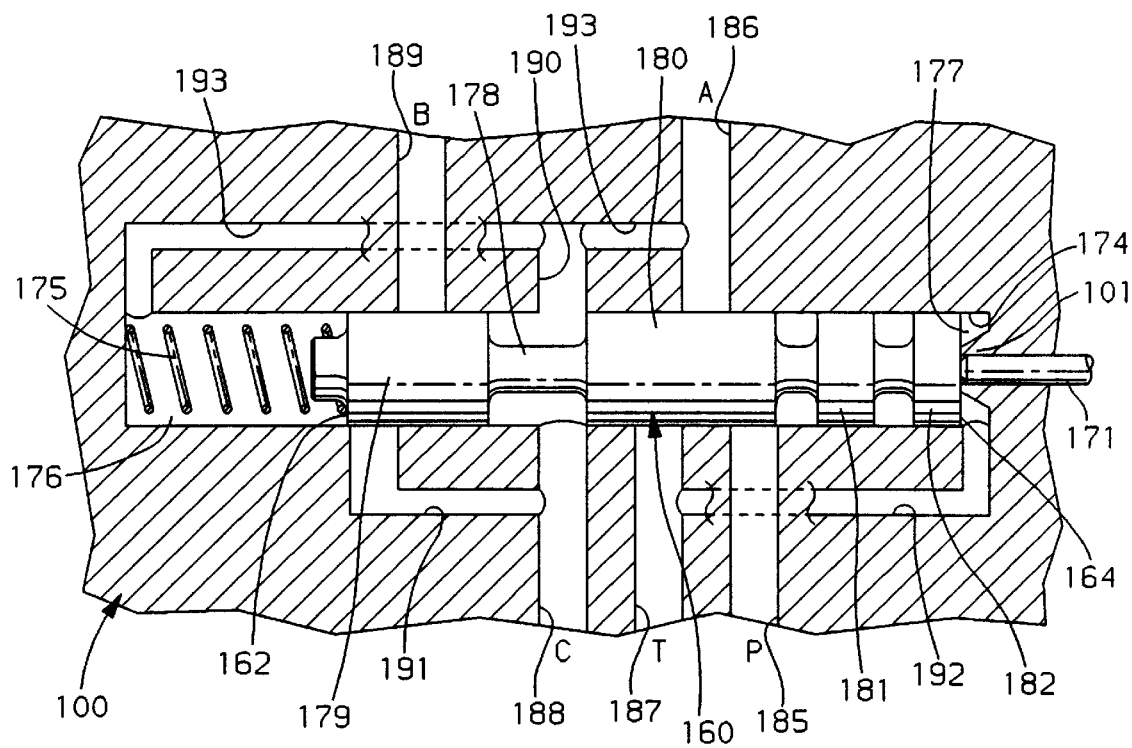
FIG. 3 is a schematic representation of an integral control and isolation valve in the base brake position.

Referring to FIGS. 2 and 3, details of integral control and isolation valves 52, 54, 56 and 58 are illustrated. In FIG. 2, the valve is illustrated, schematically, in a position corresponding to the automatic mode of the system 10. In FIG. 3, the valve is illustrated, schematically, in a position corresponding to the base brake mode of the system 10 which is the default position.

Illustrated in FIG. 2 is a valve which is representative of integral control and isolation valves 52, 54, 56 and 58. Not illustrated are features such as seals, port connections and the actuator which are conventionally known items or items constructed as conventionally known in the art to provide the necessary operational features of the present invention. The valve is constructed to provide positive valve shutoff which inhibits leakage across the valve. This prevents rise or drop of brake pedal actuator 20 which would otherwise be possible if high pressure leakage across the valve occurred.

Valve body 100 includes bore 174 in which spool piece 160 is slidably positioned. Extending through valve body 100 into chamber 177 is actuator rod 171, which engages the end 164 of spool piece 160. Positioned around actuator rod 171 and extending from valve body 100 into chamber 177 is stop 101. Spring 175 is positioned in chamber 176 and abuts end 162 to bias spool piece 160 to the right. This accounts for the spring offset feature of the valve which maintains contact between end 164 of spool piece 160 and actuator rod 171 and also places the end 164 at or near stop 101, (as illustrated in FIG. 3), when actuator rod 171 retracts from bore 174 or when the actuator is not energized. When the actuator is energized to move spool piece 160 to the left into a variable position corresponding to the automatic mode, the actuator works against the force of compression spring 175 and the fluid force supplied to chamber 176 through passage 193.

A plurality of passages through valve body 100 create an interconnecting network of flow paths through valve body 100 to provide the invention's control scheme between the five ports P, T, C, A and B. Passage 185 extends between port P and bore 174. Passage 187 extends between port T and bore 174. Passage 188 extends between port C and bore 174. Passage 186 extends between port A and bore 174. Passage 189 extends between port B and bore 174. Passage 192 extends between passage 187 and chamber 177 of bore 174. Passage 191 extends between passage 188 and bore 174. Passage 193 extends between passage 186 and chamber 176 of bore 174 and is connected through passage 190 which extends into bore 174.

Spool piece 160 includes stem 178 and valve lands 179, 180, 181 and 182. By selectively changing the position of spool piece 160, selected communication schemes are provided between the passages and therefore, between the valve's five ports. The valve's actuator, as controlled by the ECU, modulates spool piece 160 axially through the bore 174 to change positions.

The system 10 is designed to operate with spool piece 160 locatable in two primary positions. A first primary position is illustrated in FIG. 2 and corresponds to the automatic mode operation of the valve. In this position, the integral control and isolation valve provides an isolated brake pedal channel with artificial pedal feel devices 30 and 32 providing feedback to brake pedal actuator 20.

In the automatic mode position, port A is in communication with either port P or port T or alternately, is closed maintaining pressure in the brake line as illustrated in FIG. 2. Modulation occurs between port P and port T, through the closed position, by means of the valve's actuator as controlled by the ECU to supply the selected fluid pressure to the brake line. In the automatic mode, port T is in communication with bore 174 through passage 187 and also with chamber 177 through passage 192. Port P is in communication with bore 174 through passage 185.

As illustrated in FIG. 2, land 181 is positionable in a central location closing port A off from ports P and T and maintaining the existing pressure in the brake line. Port A is alternatively in communication with bore 174 to the right of valve land 181, when spool piece 160 is modulated to the left by movement of actuator rod 171, or to the left of valve land 181, when spool piece 160 is modulated to the right by movement of actuator rod 171.

When passage 186 is in communication with bore 174 to the right of valve land 181, fluid communication exists between port A and port P. This permits pressurized fluid to flow from port P through port A to the brake line and therefore, to the brake. Fluid flow rate through the valve is dependent on the size of the flow path established by movement of valve land 181.

When passage 186 is in communication with bore 174 to the left of valve land 181, fluid communication exists between port A and port T. This permits pressurized fluid in the brake line and therefore, from the brake, to flow from port A through port T to the return line. Fluid flow rate through the valve is dependent on the size of the flow path established by movement of valve land 181.

ECU control over the modulated communication between ports P and A and ports T and A, provides a proportional increased or decreased fluid pressure to the wheel brake in response to an increased or decreased fluid pressure in the brake pedal channel as sensed at pressure transducer 70.

Proportioning is the action of a proportioner or proportional valve to vary the fluid pressure that is applied to a brake channel or an individual brake in accordance with a preselected variable or variables. In this embodiment The ECU varies the control signal supplied to the actuators 80, 82, 84 and 86 to position the valves 52, 54, 56 and 58 to provide a proportional braking pressure in response to pressure changes in pressure line 102 and also in response to predetermined ABS and TC conditions.

A pressure increase in the brake pedal channel results from application of manual force on the brake pedal actuator 20. When a pressure increase is sensed at pressure transducer 70 the pressure magnitude is communicated to the ECU, the controller signals the actuator or actuators of integral control and isolation valves 52, 54, 56 and/or 58 to modulate spool piece(s) 160 to the left (from the position illustrated in FIG. 2) which establishes fluid communication between ports P and A permitting pressurized fluid flow through any or all of branch lines 122, 124, 126, and 128 through the integral control and isolation valve(s), from ports P to port A, through the brake lines 140, 142, 144, and 146 to the associated wheel brakes 18, 12, 14 and/or 16 which selectively increases braking action.

In response to a reduction in pressure magnitude as sensed by pressure transducer 70 and communicated to the ECU, the controller signals the actuator or actuators 80, 82, 84 and/or 86 of integral control and isolation valves 52, 54, 56 and/or 58 to modulate each spool piece 160 to the right (from the position illustrated in FIG. 2), which permits fluid communication between ports A and T of each valve and closes off fluid communication between port A and port P of each valve. This permits the pressurized fluid in brake lines 140, 142, 144 and 146 to return through the valves 52, 54, 56, and 58 through ports A and T and through return lines 151, 153, 155 and 157 releasing braking pressure at the wheel brakes 18, 12, 14 and 16 which selectively reduces the braking action.

Through the full range of automatic mode modulation, a fluid communication condition remains between port C and port B through passage 188, 191, bore 174 and passage 189. This maintains the brake pedal channel(s) in an open condition, so that the associated pressure chamber of master cylinder 22 is in communication with a corresponding artificial pedal feel device 30 or 32 to emulate a preselected pedal feel characteristic.

In addition to providing independent control to the wheel brakes 18, 12, 14 and 16 in response to application of manual pressure to brake pedal actuator 20, the ECU automatically communicates with any or all of the integral control and isolation valves 52, 54, 56 and 58, to selectively apply additional or less braking action to selected wheel brakes whenever a TC or ABS situation is called for. These functions are provided by system 10, in association with ABS and TC sensors and algorithm systems conventionally known in the art.

When an anti-lock braking situation is present, the ECU signals the integral control and isolation valve to selectively reduce the pressure in a selected wheel's brake line to thereby inhibit wheel slip (skidding) occurrences in relation to the road surface. When a traction control situation is present, the ECU signals the integral control and isolation valve to selectively apply additional braking pressure to the brake line of a selected wheel or wheels, thereby, inhibiting wheel slip in relation to the road surface from occurring. Through means of integral control and isolation valves 52, 54, 56 and 58, full proportional and independent control is provided to each wheel brake.

FIG. 3 illustrates the integral control and isolation valve in the base brake mode which is the default position whenever an operational preprogrammed event in a proportional valve is detected. The illustrated position of spool piece 160 corresponds to the base brake mode of operation. In a preprogrammed event situation, the ECU is programmed to selectively default either the one valve in which the event occurs, or all of the valves, to the base brake mode depending on the situation or the type of the event.

In the base brake mode the integral control and isolation valve is positioned so that ports C and A are in fluid communication through passages 188, bore 174, passage 190, passage 193 and passage 186. This allows the brake pedal channel to provide braking pressure directly to the wheel brake through application of manual force to brake pedal actuator 20 and provides braking pressure to the limit that is created by actuation of the brake pedal actuator 20 and the preferably non-boosted master cylinder 22.

In the base brake mode the artificial pedal feel devices 30 and 32 are eliminated from the brake pedal circuit providing a solid pedal feel. Full isolation of the pedal channels is provided. All other valve ports are closed in this mode.

What is claimed is:

1. A brake system operating on fluid pressure comprising:
   a master cylinder;
   an artificial pedal feel device;
   a brake;
   a powered fluid supply; and
   a valve, selectively positionable in a first position providing fluid communication between the master cylinder and the brake and in a second automatically controlled range of positions providing modulated fluid communication between the powered fluid supply and the brake while providing constantly open fluid communication between the master cylinder and the artificial pedal feel device.

2. A brake system operating on fluid pressure according to claim 1 further comprising a conduit extending between the master cylinder and the valve, a pressure transducer mounted along the conduit capable of sensing fluid pressure in the conduit and wherein the valve is selectively positioned in response to the fluid pressure in the conduit.

3. A brake system operating on fluid pressure according to claim 2 further comprising a wheel wherein the valve is additionally selectively positioned within the automatically controlled range of positions to increase or decrease the fluid pressure at the brake to limit slip of the wheel.

4. A brake system comprising:
   a manually actuated master cylinder;
   a powered fluid supply;
   a fluid return;
   a brake; and
   an integral control and isolation valve having an automatic position and a base brake position, the positions corresponding to first and second modes of operation, the first mode of operation characterized by positioning the integral control and isolation valve in the automatic position wherein the brake is automatically modulated between being in fluid communication with the powered fluid supply and the fluid return while the master cylinder is out of communication with the brake and the second mode of operation characterized by positioning the integral control and isolation valve in the base brake position wherein the brake is in fluid communication with the manually actuated master cylinder.

5. A brake system according to claim 4 further comprising a conduit extending between the manually actuated master cylinder and the integral control and isolation valve wherein the integral control and isolation valve is selectively positioned in response to fluid pressure in the conduit.

6. A brake system according to claim 5 further comprising a wheel wherein the integral control and isolation valve is additionally selectively positioned to effect an increase or a decrease in the fluid pressure at the brake to limit slip of the wheel.

7. A brake system operating on fluid pressure having an automatic mode and a base brake mode of operation comprising:
   a brake;
   a pressurized fluid supply;
   a fluid return system;
   a manually actuated master cylinder;
   an artificial pedal feel device; and
   an integral control and isolation valve having a port A in fluid communication with the brake, in the automatic mode the port A being automatically modulated between being closed, being in fluid communication with a port P that is in fluid communication with the pressurized fluid supply and being in fluid communication with a port T that is in fluid communication with the fluid return system, and the integral control and isolation valve having a port C that is in fluid communication with the manually actuated master cylinder and a port B in fluid communication with an artificial pedal feel device, and wherein, in the base brake mode the port A is in fluid communication with the port C and the port B is closed and in the automatic mode the port C is in constant fluid communication with the port B.

8. A brake system operating on fluid pressure according to claim 7, further comprising a conduit extending between the manually actuated master cylinder and the integral control and isolation valve wherein the integral control and isolation valve is selectively positioned in response to the fluid pressure in the conduit.

9. A brake system operating on fluid pressure according to claim 8, further comprising a wheel wherein the integral control and isolation valve is additionally selectively positioned to effect an increase or a decrease in the fluid pressure at the brake to limit slip of the wheel.

* * * * *